(12) United States Patent
Kyoukane et al.

(10) Patent No.: US 10,642,098 B2
(45) Date of Patent: May 5, 2020

(54) ILLUMINATION DEVICE AND DISPLAY DEVICE

(71) Applicant: SHARP KABUSHIKI KAISHA, Sakai, Osaka (JP)

(72) Inventors: Youzou Kyoukane, Sakai (JP); Hisashi Watanabe, Sakai (JP); Hirotoshi Yasunaga, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/504,824

(22) Filed: Jul. 8, 2019

(65) Prior Publication Data

US 2020/0019017 A1 Jan. 16, 2020

Related U.S. Application Data

(60) Provisional application No. 62/696,507, filed on Jul. 11, 2018.

(51) Int. Cl.
*G09F 13/04* (2006.01)
*G09F 13/08* (2006.01)
*G02F 1/13357* (2006.01)

(52) U.S. Cl.
CPC .. *G02F 1/133605* (2013.01); *G02F 1/133606* (2013.01); *G02F 1/133611* (2013.01); *G02F 2001/133612* (2013.01); *G02F 2001/133628* (2013.01)

(58) Field of Classification Search
CPC .... G02F 1/1333–133611; G02F 2001/133612; G02F 2001/133628
USPC ....... 362/97.1–97.4, 612, 623–626, 630–634
See application file for complete search history.

(56) References Cited

FOREIGN PATENT DOCUMENTS

JP 2013-118117 A 6/2013

*Primary Examiner* — Jason M Han
(74) *Attorney, Agent, or Firm* — ScienBiziP, P.C.

(57) ABSTRACT

[Object] To provide an illumination device that enables uniform illumination by preventing an air layer from intervening between an adhesive layer and a substrate through manual bonding of a reflection sheet, and a display device including the illumination device.

[Solution] An illumination device includes a substrate including a wiring pattern, a plurality of light sources connected to the wiring pattern, an adhesive layer disposed on the substrate, and a reflection sheet bonded to the substrate with the adhesive layer interposed therebetween. The reflection sheet includes openings corresponding to the plurality of light sources. In a first direction, the reflection sheet is located between the substrate and light-emitting surfaces of the light sources. The substrate has an air vent in an area in which the wiring pattern is not disposed and the adhesive layer is disposed.

9 Claims, 19 Drawing Sheets

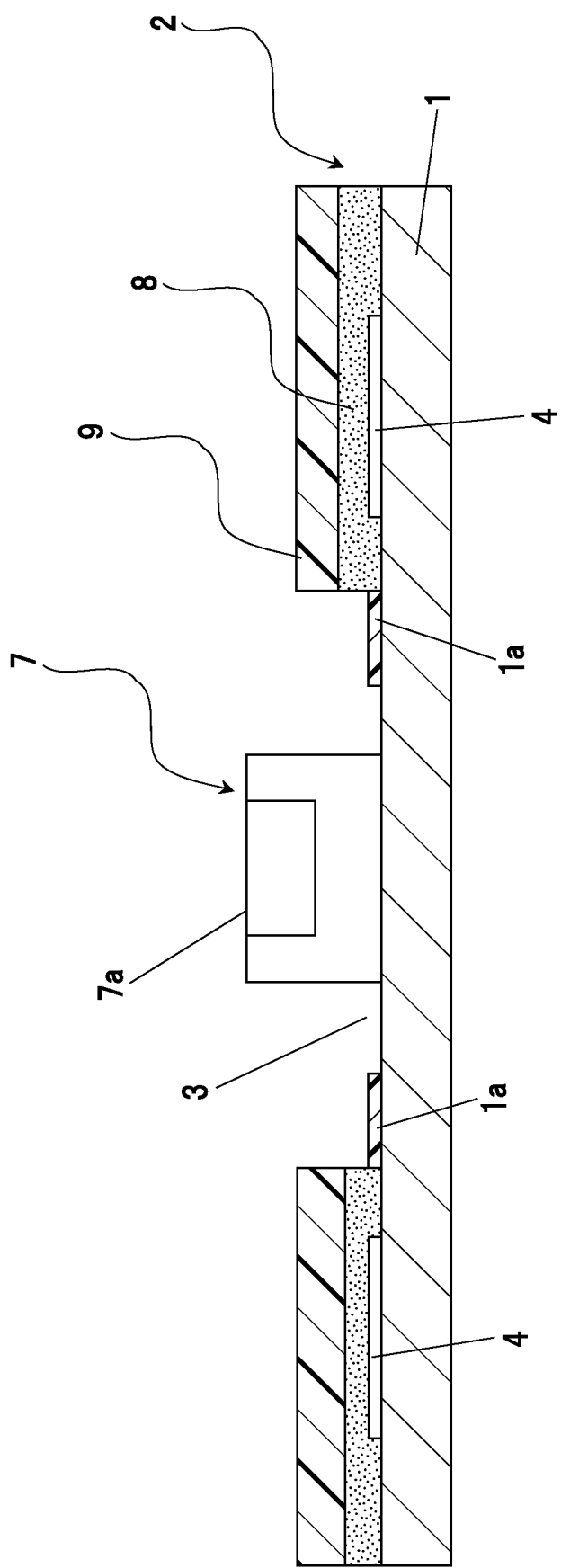

ILLUMINATION DEVICE AND DISPLAY DEVICE

TECHNICAL FIELD

The present invention relates to an illumination device and a display device.

BACKGROUND ART

Products pursuing high quality and high luminance, such as TV or signage in particular, have been employing liquid crystal displays having the display contrast enhanced by local dimming. Local dimming here is a technology of partially controlling light sources disposed in a backlight device to control the amount of light from individual light sources. Particularly, so-called direct backlight devices, including light sources disposed at the back surface of a light-emitting surface of an illumination device included in the backlight devices, have been increasingly used since the direct backlight devices facilitate driving of local dimming.

Direct backlight devices have been widespread among displays including car-mount small displays these years. Direct backlight devices, however, have the following problems for use under predetermined high-temperature environments.

In direct backlight devices in an oversize display, a reflection sheet is usually partially fixed to a light-source substrate with rivets or other components. However, in direct backlight devices in small and midsize displays, a reflection sheet is merely placed on the light-source substrate without being fixed to the light-source substrate with rivets or other components, unlike in the case of an oversize display. Moreover, the reflection sheet is located lower than the upper surfaces of the light sources for enhancing the light use efficiency.

With reference to FIG. 17 to FIG. 19, a structure of an illumination device 2 included in a typical direct backlight device will be described. As illustrated in FIG. 17, the illumination device 2 includes a light-source substrate 1, including multiple light sources 7 such as LEDs arranged side by side, and a reflection sheet 9, which is a single sheet over a light-source substrate 20 mainly between the light sources 7. The reflection sheet 9 has multiple light source openings 3, which individually open the multiple light sources 7. Here, to open represents to let the light sources 7 exposed without being covered by the reflection sheet 9 disposed over the light-source substrate 1.

The illumination device 2 includes a diffusion sheet 6, disposed to face light-emitting surfaces 7a of the light sources 7 of the light-source substrate 1. The light-source substrate 1 has its surface coated with a white resist 1a. As in the reflection sheet 9, the white resist 1a has a white reflection surface having high light reflectivity to enhance the light use efficiency of the illumination device 2.

Specifically, the white resist 1a is disposed on a portion through which the light-source substrate 1 on which the reflection sheet 9 is disposed is exposed.

Thus, most part of the portion of the light-source substrate 1 on which the light source 7 is not disposed is covered with the white reflection sheet 9 and the white resist 1a having high light reflectivity.

A diffusion sheet 6 has a function of diffusing light from the light sources 7, the white resist 1a, and the reflection sheet 9.

The reflection sheet 9 is subjected to stretching processing in a predetermined direction during the manufacturing step. Thus, the reflection sheet 9 thermally contracts in the extension direction when heated. A typically mass-produced reflection sheet 9 has a small thickness such as 0.188 mm or 0.225 mm, and thus is more likely to thermally contract. Thus, when the above-described illumination device is used under the high-temperature environment, the reflection sheet 9 contracts in the extension direction with the thermal effect, and may overlap the light source 7. The light source 7 covered with the reflection sheet 9 locally causes bright and dark portions and uneven luminance, and degrades the display quality.

To address this, PTL 1 describes an illumination device that has slits around the openings of the reflection sheet. The slits can effectively solve thermal distortion of the reflection sheet. Compared to the structure including, for example, openings, this illumination device has a wider reflection surface, and is thus assumed to prevent reduction of light use efficiency.

CITATION LIST

Patent Literature

[PTL 1] Japanese Unexamined Patent Application Publication No. 2013-118117

SUMMARY OF INVENTION

Technical Problem

However, when used under the above-described high-temperature environment, the entire reflection sheet having slits is also assumed to thermally contract. Specifically, when the entire reflection sheet thermally contracts, the reflection sheet adjacent to the light sources similarly covers the light-emitting surfaces of the light sources, or touches or adjoins to the side surfaces. Local distortion of the reflection sheet causes uneven luminance. This is because the reflection sheet covers some light sources but not others, or the way how or how much the reflection sheet covers each light source differs per light source. Thus, the structure of the above invention fails to prevent reduction of light use efficiency due to thermal contraction.

As illustrated in FIG. 18, a structure including an adhesive layer interposed between the reflection sheet 9 and the light-source substrate 1 has been disclosed to prevent the reflection sheet 9 from being affected by thermal contraction. This structure enhances the adhesive strength of the entirety of the reflection sheet 9, and can prevent expansion or contraction with thermal effect.

In a structure including the adhesive layer on the reflection sheet 9, a roller or the like may be used to uniformly bond the light-source substrate 1 and the reflection sheet 9 together. However, the use of a roller or the like for bonding is restricted since the light sources are located higher than the reflection sheet. Thus, bonding the reflection sheet 9 requires a bonding method that is not restricted by the height of the light source. For example, manual bonding is assumed. Manual bonding is not suitable for uniform bonding over a wide area unlike a roller or the like. Thus, as illustrated in FIG. 19, bubbles 4 may form in an adhesive layer 8, and thus reduce the adhesive strength. When the above illumination device is used under a high-temperature environment, air constituting the bubbles 4 may thermally expand and further reduce the adhesive strength. Moreover, the reflection sheet may swell at portions over the bubbles 4, which causes reduction of light use efficiency.

The present invention thus provides an illumination device including a reflection sheet with high adhesive strength, the reflection sheet being provided with an adhesive layer usable under a predetermined high-temperature environment, and provides a display device including the illumination device. The illumination device and the display device prevent uneven luminance due to thermal contraction and enable uniform illumination.

Solution to Problem (1) One embodiment of the present invention provides an illumination device that includes a substrate including a wiring pattern, a plurality of light sources connected to the wiring pattern, an adhesive layer disposed on the substrate, and a reflection sheet bonded to the substrate with the adhesive layer interposed therebetween, wherein the reflection sheet includes openings corresponding to the plurality of light sources, wherein, in a first direction, the reflection sheet is located between the substrate and light-emitting surfaces of the light sources, and wherein the substrate has an air vent in an area in which the wiring pattern is not disposed and the adhesive layer is disposed.

(2) An embodiment of the present invention provides an illumination device, besides the above structure (1), wherein the adhesive layer is disposed over an entirety of the reflection sheet.

(3) An embodiment of the present invention provides an illumination device, besides the above structure (1), wherein the adhesive layer extends in a stripe form in a longitudinal direction of the reflection sheet.

(4) An embodiment of the present invention provides an illumination device, besides the above structure (1), wherein the air vent is disposed on a straight line located to bisect a distance between adjacent two of the plurality of light sources in a longitudinal direction of the reflection sheet.

(5) An embodiment of the present invention provides an illumination device, besides the above structure (1), wherein a heat dissipation system is disposed on a surface of the substrate opposite to a surface on which the reflection sheet is laminated.

(6) An embodiment of the present invention provides an illumination device, besides the above structure (5), wherein the heat dissipation system includes a dissipator sheet.

(7) An embodiment of the present invention provides an illumination device, besides the above structure (5), wherein the heat dissipation system includes a heat sink, and wherein the heat sink includes a body and a radiator fin.

(8) An embodiment of the present invention provides an illumination device, besides the above structure (5), wherein at least one of corners of each of the light sources is in contact with a corresponding one of the openings in the reflection sheet.

(9) An embodiment of the present invention is a display device that includes the illumination device according to the above structure (1) and a display.

Advantageous Effects of Invention

The present invention allows bubbles that form during manual bonding of a reflection sheet to be ejected to a light-source substrate to enhance the bonding strength between the reflection sheet and the light-source substrate. The enhancement of the adhesive strength reduces the effect of thermal contraction and enables uniform illumination.

BRIEF DESCRIPTION OF DRAWINGS

FIG. 19 is a schematic cross-sectional view of the illumination device illustrated in FIG. 18 in the state where bubbles form.

DESCRIPTION OF EMBODIMENTS

First Embodiment

Figure 1:
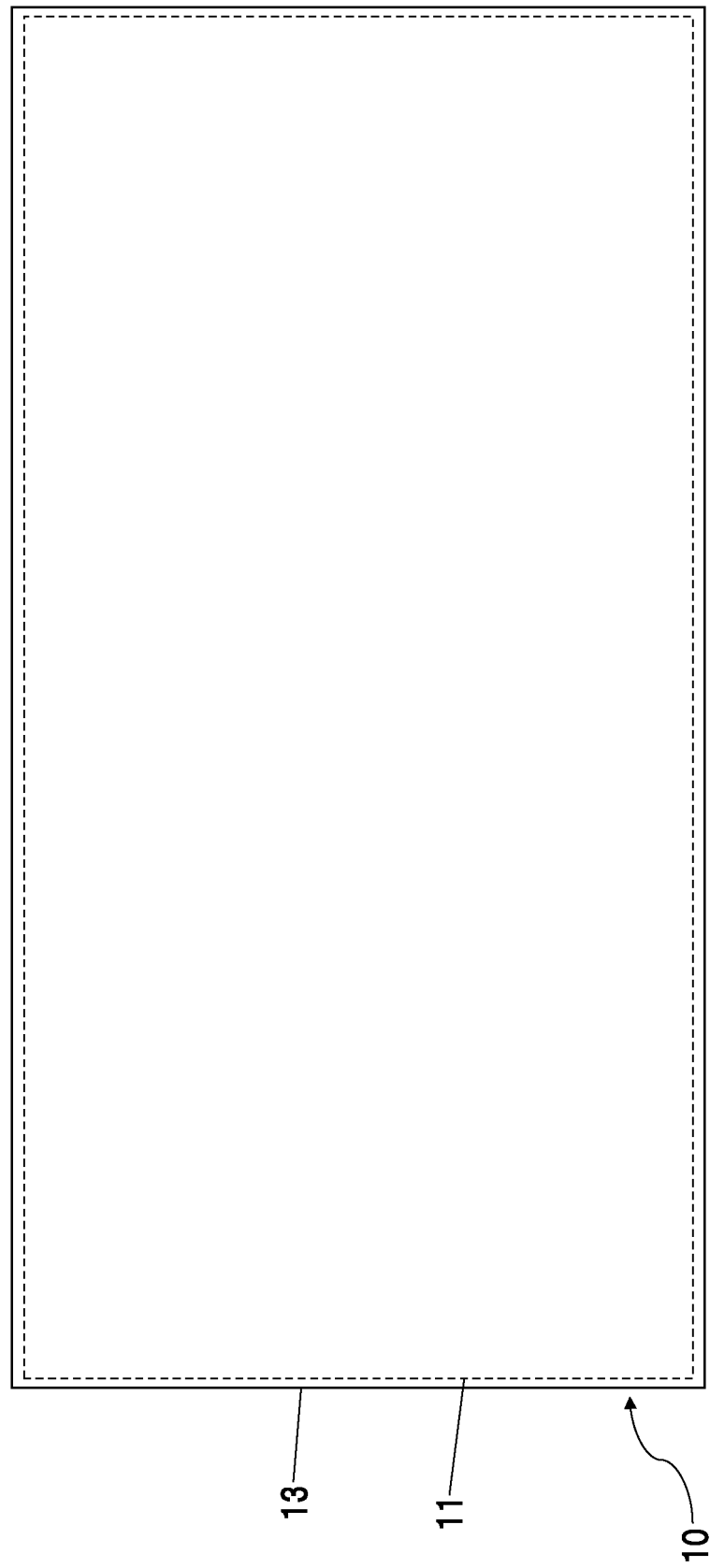
FIG. 1 is a plan view of a liquid crystal display device including an illumination device according to a first embodiment.
Figure 2:
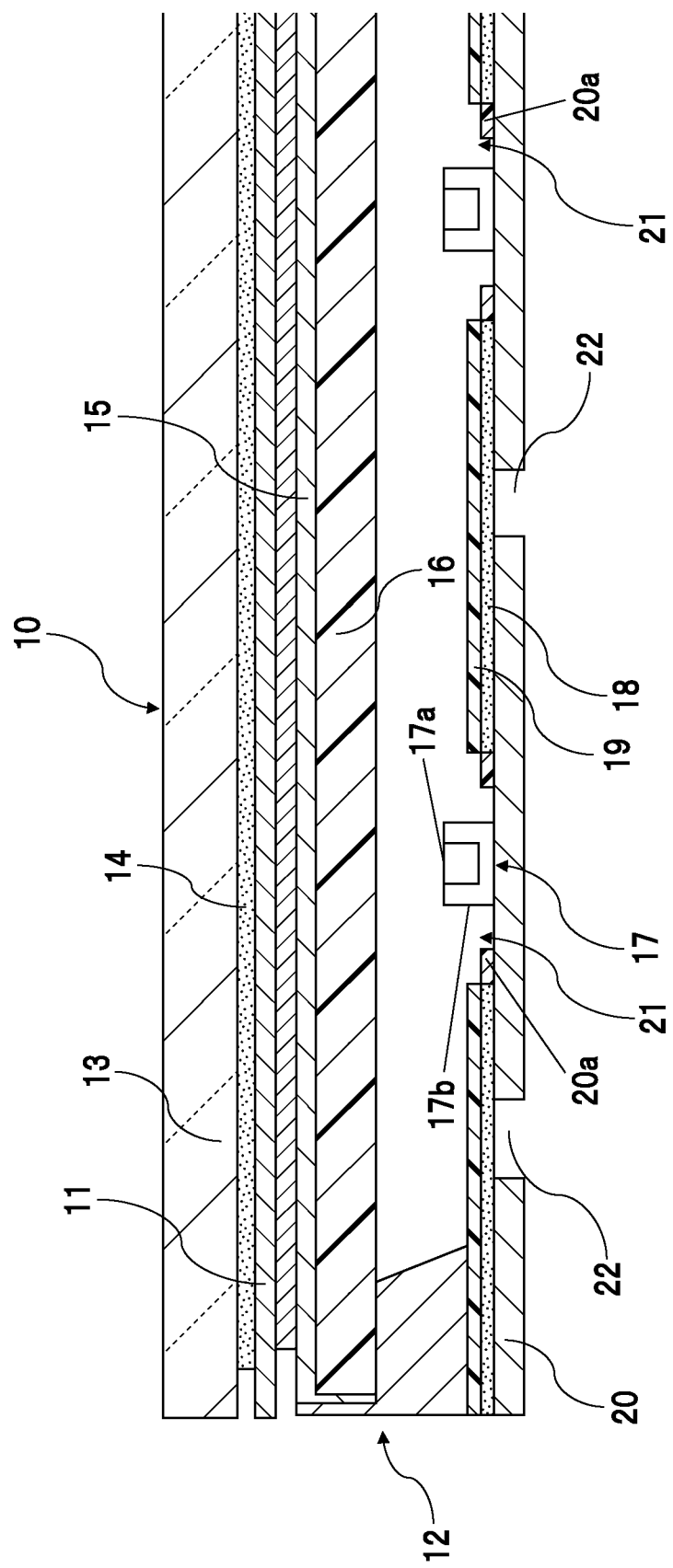
FIG. 2 is a schematic cross-sectional view of a portion of the liquid crystal display device including the illumination device according to the first embodiment.

FIG. 1 and FIG. 2 illustrate a liquid crystal display device including an illumination device according to a first embodiment. FIG. 1 is a plan view of a liquid crystal display device, and FIG. 2 is a schematic cross-sectional view of a portion of the liquid crystal display device. As illustrated in FIG. 1 and FIG. 2, a liquid crystal display device 10 is, for example, rectangular in a plan view, and includes a liquid crystal panel 11, a transparent protective member 13, which protects the upper surface of the liquid crystal panel 11, and an illumination device 12, which functions as a backlight of the liquid crystal panel 11. In the present embodiment, the liquid crystal display device 10 includes a 12.3-inch display screen for car-mounted application use. The liquid crystal panel 11 may include a touchscreen instead of the transparent protective member 13 or between the transparent protective member 13 and the liquid crystal panel 11.

Although components are not illustrated in detail, the liquid crystal panel 11 includes a pair of glass substrates bonded together with a predetermined gap interposed between, and liquid crystal sealed in between both glass substrates.

The illumination device 12 is a direct illumination device, and disposed on a surface of the liquid crystal panel 11 opposite to a display surface. The illumination device 12 includes an optical member group 15, a diffusion sheet 16, a reflection sheet 19, and a light-source substrate 20. These optical members are disposed in order of, for example, the optical member group 15, the diffusion sheet 16, and the reflection sheet 19 from the side closer to the light-emission surface. Specifically, the optical member group 15 is disposed between the liquid crystal panel 11 and the diffusion sheet 16. Here, although not illustrated, the optical member group 15 includes, for example, a luminance enhancement film and a prism sheet. The diffusion sheet 16 is formed from a plate made of a synthetic resin in which light scattering particles are dispersed to have a light scattering function.

The diffusion sheet 16 faces light-emitting surfaces 17a of light sources 17 on the light-source substrate 20 while being spaced a predetermined distance d (approximately 4 mm, in this example) apart from the light-emitting surface 17a. Examples of a material usable for the diffusion sheet 16 include a heat-resisting resin material such as a polycarbonate resin or an acrylic resin. The distance d between the diffusion sheet 16 and the light-source substrate 20 may be determined based on, for example, the pitch between the multiple light sources 17.

The liquid crystal display device 10 also includes the transparent protective member 13 disposed on the liquid crystal panel 11. The transparent protective member 13 is bonded onto the liquid crystal panel 11 with a transparent binder 14, such as a functional film called "optical clear adhesive (OCA) film", interposed therebetween. The transparent protective member 13 may be formed from a cover glass or a touchscreen, and has a function of protecting the display surface of the liquid crystal panel 11.

Figure 3:
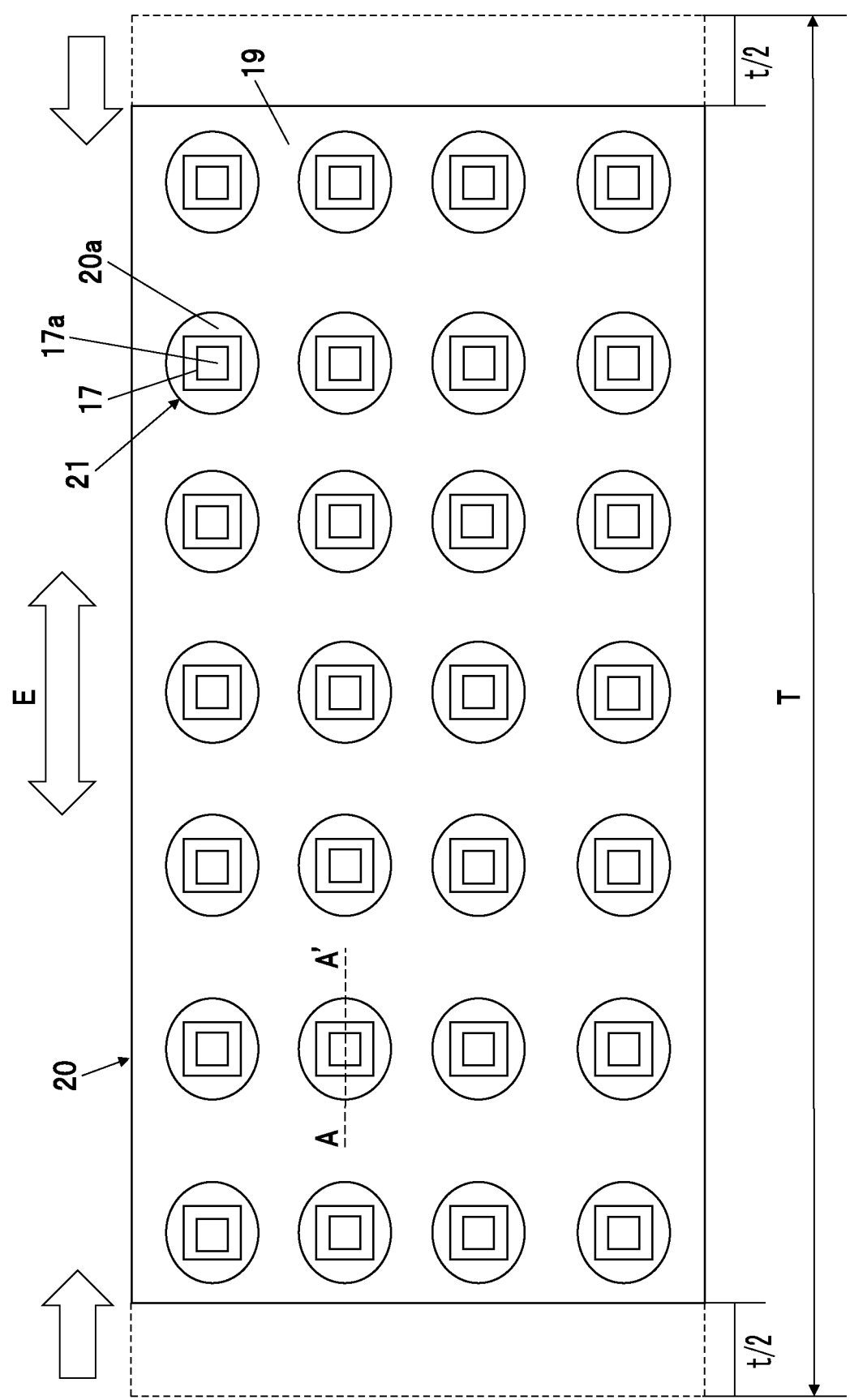
FIG. 3 is a schematic plan view of the illumination device illustrated in FIG. 2 from which an optical member group and a diffusion sheet are removed.

FIG. 3 is a schematic plan view of the illumination device illustrated in FIG. 2 from which the optical member group and the diffusion sheet are removed. As illustrated in FIG. 3, on the light-source substrate 20, multiple light sources 17 that emit white light are arranged in a matrix at a predetermined pitch.

Figure 4:
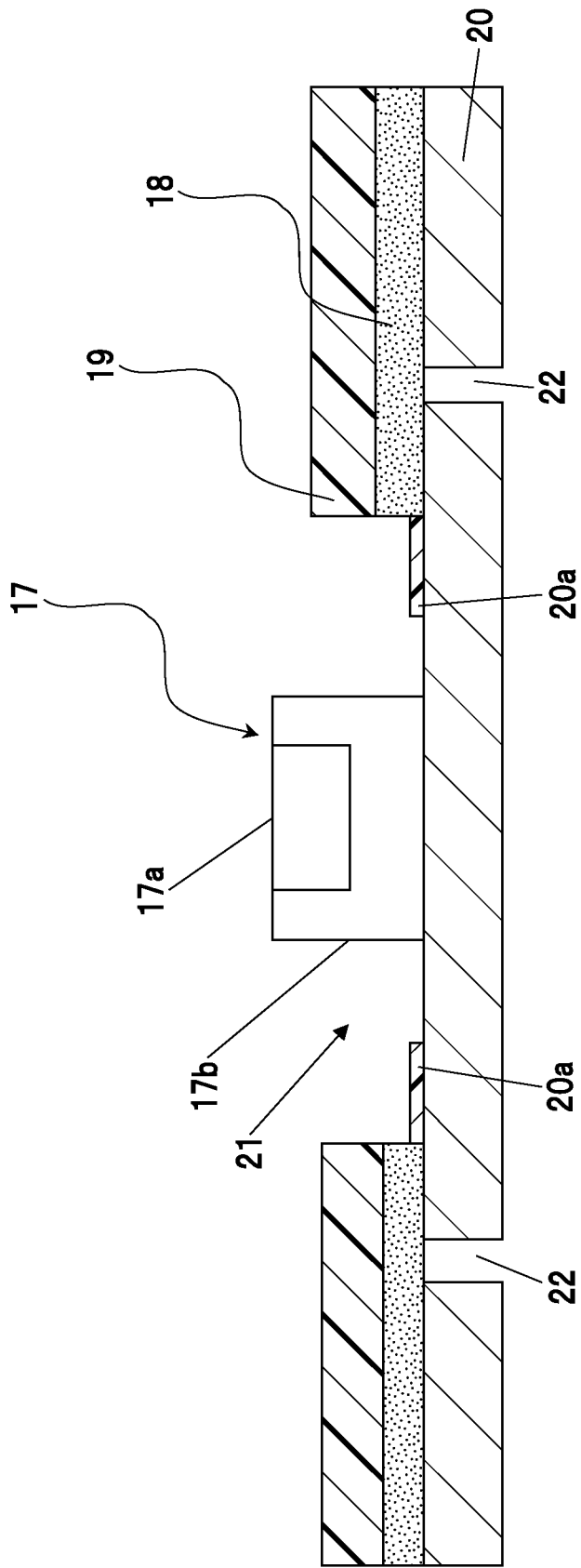
FIG. 4 is a schematic cross-sectional view of a portion of a light source illustrated in FIG. 2 and FIG. 3.

FIG. 4 is also referred to, below. FIG. 4 is a schematic cross-sectional view of a portion of the light source illustrated in FIG. 3. As illustrated in FIG. 4, each light source 17 includes a light-emitting surface 17a, which emits light in the direction away from the light-source substrate 20. The light sources 17 used in the example are so-called top-view light-emitting light sources, and have light-emitting side surfaces 17b, which emit light from the side surfaces of a package formed from a transparent resin. Here, top-view light-emitting light sources are light sources that emit highly straight light. The light sources 17 are mounted on a light-source substrate 20, which is a rigid substrate made of a metal such as aluminum or a flexible substrate made of a resin material such as polyimide. When each light source 17 is viewed in a plan, the light-emitting surface 17a typically has a rectangular, square, elliptical, or circular shape.

The reflection sheet 19 overlaps the light-source substrate 20. The reflection sheet 19 has light source openings 21 corresponding to the multiple light sources 17. The multiple light source openings 21 have the same or substantially the same shape as the light sources 17 in accordance with the shape of the light sources 17. All the light source openings 21 have the same shape. Here, the upper surface of the reflection sheet 19 is located between the light-source substrate 20 and the light-emitting surfaces of the light sources 17 in a first direction. The first direction here refers to a light emission direction of the light sources 17. The reflection sheet 19 has an adhesive layer 18 disposed between itself and the light-source substrate 20. The adhesive layer is disposed over substantially the entirety of the light-source substrate 20 excluding the light source openings 21. Examples of the material usable for the reflection sheet 19 include a polyethylene terephthalate (PET) resin, a polypropylene (PP) resin, a polyvinyl chloride (PVC), a polycarbonate (PC) resin, and an acryl (PMMA) resin. The reflection sheet 19 is formed from a PET resin among these examples. The reflection sheet 19 has a structure including a base made of, for example, a PET resin coated with evaporated aluminum.

Here, the reflection sheet 19 is extended in a predetermined extension direction E in the manufacturing process. The extension direction E of the reflection sheet 19 illustrated in FIG. 3 can be investigated using, for example, an ellipsometer that measures a change of polarization between incident light incident on the reflection sheet 19 and reflection light reflected off the reflection sheet 19. Specifically, a change of polarization between incident light and reflection light causes a phase difference between s-polarized light and p-polarized light, that is, the light reflectance difference, and is defined with a phase difference $\Delta$ between s-polarized light and p-polarized light, and a reflective amplitude ratio angle $\phi$ between s-polarized light and p-polarized light, usually denoted with ($\phi$, $\Delta$).

The illumination device 12 is required to have heat resistance for a predetermined high-temperature environment (at a temperature exceeding, for example, 60° C.). When the temperature of the environment reaches the temperature at which the reflection sheet 19 subjected to extension starts large thermal contraction, the reflection sheet 19 thermally contracts in the extension direction E. For example, under a high-temperature environment of 95° C., the reflection sheet 19 formed from a PET resin has a thermal contraction ratio $\mu$ of approximately 0.4%. Here, the thermal contraction amount t of the reflection sheet 19 with a full length T in the extension direction E of approximately 300 mm is approximately 1.2 mm. The thermal contraction ratio here is the ratio of the thermal contraction amount t of the reflection sheet 19 in the extension direction E under a predetermined high-temperature environment to the full length T of the reflection sheet 19 in the extension direction E.

On the other hand, enlarging the light source openings 21 of the reflection sheet 19 in consideration of thermal contraction of the reflection sheet 19 in the extension direction E reduces the reflection area of the reflection sheet 19 by the increased area of the light source openings 21, and may degrade the light use efficiency.

In a direct backlight device including an oversize display, the reflection sheet 19 is partially fixed with rivets or the like, and may not be largely affected by thermal contraction.

In contrast, in a midsize or small-size display, the reflection sheet 19 is not allowed to be fixed to the light-source substrate 20 with rivets or the like from the size point of view.

Specifically, small and midsize displays are not structured in consideration of thermal contraction of the entirety of the reflection sheet 19. Thus, small and midsize displays are more likely to be affected by thermal contraction of the reflection sheet 19.

The illumination device 12 according to the present embodiment thus has the following structure.

Specifically, the adhesive layer 18 is disposed over the entire back surface of the reflection sheet 19 to allow the reflection sheet 19 to be bonded to the light-source substrate 20 with the adhesive layer 18 interposed therebetween. This structure can prevent the reflection sheet 19 from thermally contracting with the effect of heat.

(Light-Source Substrate)

Figure 5:
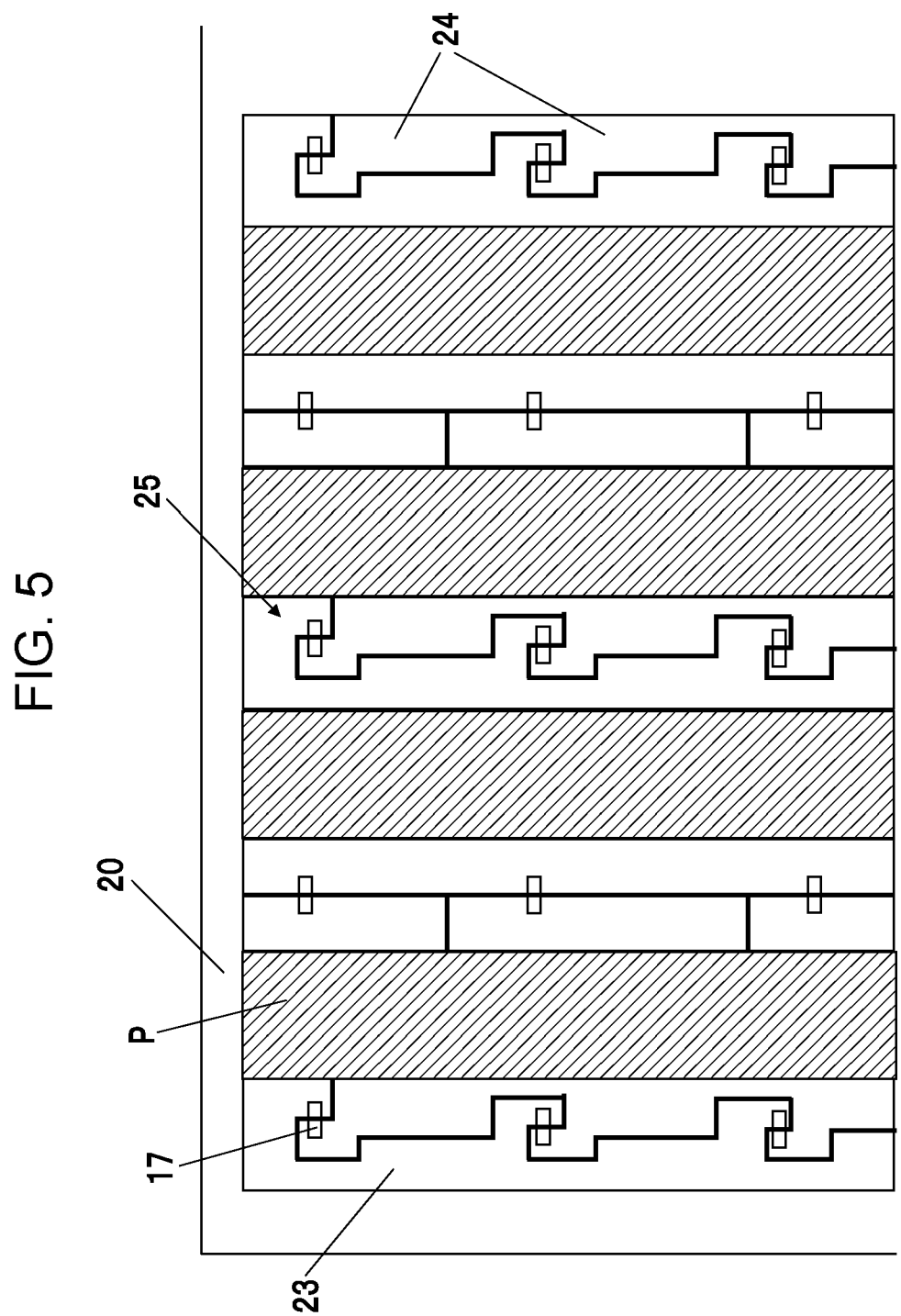
FIG. 5 is a schematic plan view of a wiring pattern of the light source illustrated in FIG. 2 and FIG. 3.

Subsequently, the light-source substrate 20 is described in detail with reference to FIG. 4 to FIG. 6. As described above, FIG. 4 is a cross-sectional view taken along line A-A' in FIG. 3. As illustrated in FIG. 4, the light-source substrate 20 is coated with a white resist 20a. The white resist 20a is a white ink resist and has a high reflectivity of, for example, approximately 70%. Thus, the white resist 20 on the light-source substrate 20 over a portion on which the light sources 17 and the reflection sheet 19 are not disposed can enhance the light use efficiency of the entirety of the illumination device 12. In the example illustrated in FIG. 4, the white resist 20a is also disposed at a portion of each light source opening 21 on which the light source 17 is not disposed.

(Wiring)

Subsequently, also with reference to FIG. 5, wirings and other components on the light-source substrate 20 will be described. FIG. 5 is a schematic plan view of a wiring pattern of the light sources illustrated in FIG. 2 and FIG. 3. Over the light-source substrate 20 coated with the white resist 20a, the multiple light sources 17 that emit white light are arranged side by side in a matrix at a predetermined pitch. The light-source substrate 20 has its potential connected to a power source (not illustrated) via a connector (not illustrated), and receives a predetermined voltage from the power source to turn on the light sources 17. The power source is controlled by a power source controller (not illustrated). FIG. 5 is a schematic plan view of a wiring pattern of light sources illustrated in FIG. 2 and FIG. 3. As illustrated in FIG. 5, the light-source substrate 20 includes a wiring pattern 25 to electrically connect an anode wiring 23 and a cathode wiring (GND pattern) 24 to the light sources 17. The power source controller performs local dimming control on the power source. Thus, the illumination device 12 can illuminate the liquid crystal panel 11 with high luminance and high contrast.

(Adhesive Layer)

As illustrated in FIG. 4, the light-source substrate 20 includes air vents 22 for removing bubbles that can form when the reflection sheet 19 is bonded to the light-source substrate 20.

To bond the reflection sheet 19 to the light-source substrate 20 with the adhesive layer 18 disposed on one surface of the reflection sheet 19 in advance interposed between the reflection sheet 19 and the light-source substrate 20, bubbles may intervene between the adhesive layer 18 and the light-source substrate 20. The air vents 22 are provided to release the bubbles from the interface between the adhesive layer 18 and the reflection sheet 19. The air vents 22 are through-holes.

Figure 6:
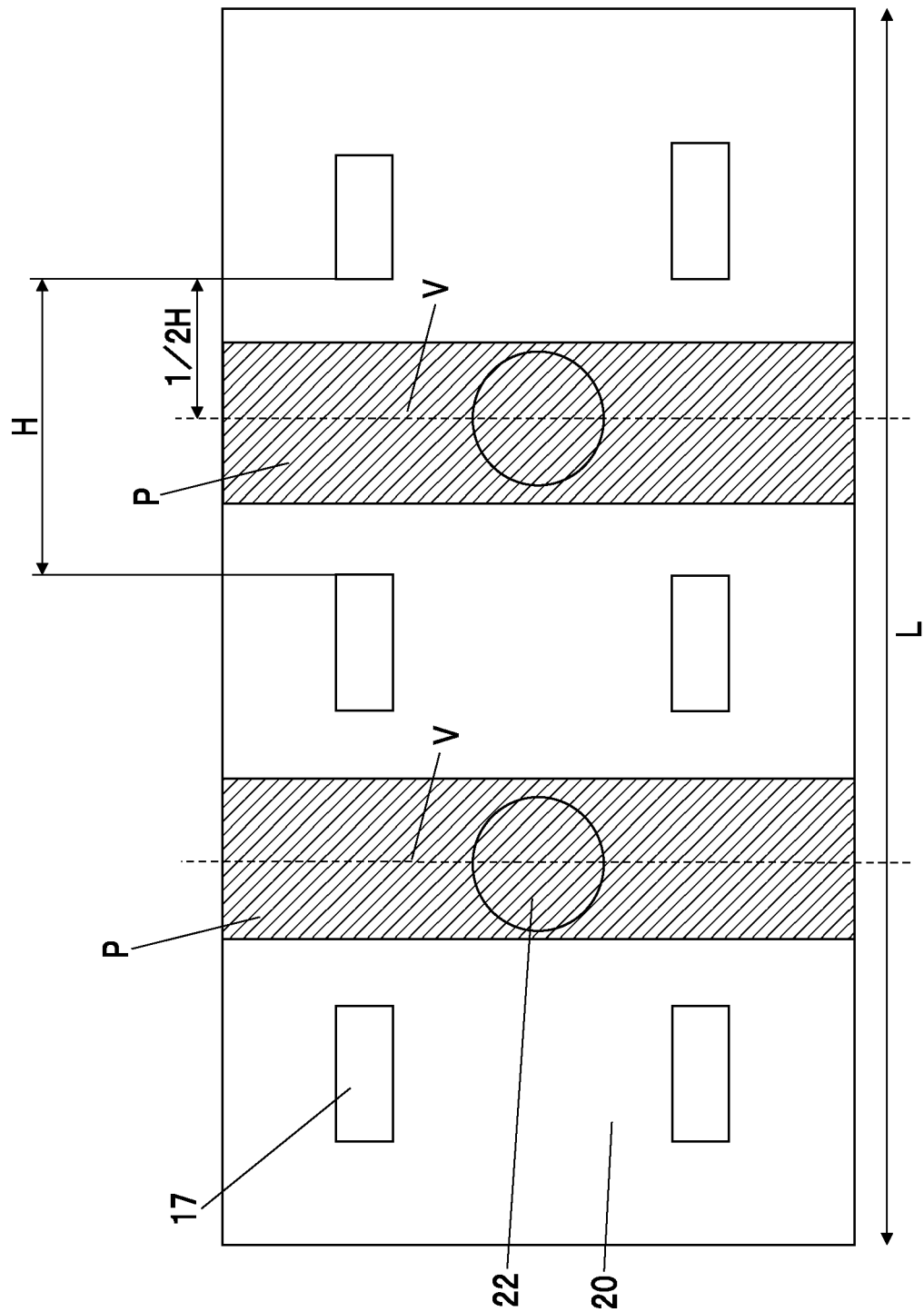
FIG. 6 is a schematic plan view of positions recommendable for air vents in a light-source substrate.

FIG. 6 is a schematic plan view of a light-source substrate with positions recommendable for forming the air vents. The positions at which the air vents 22 are formed are described with reference to FIG. 5 and FIG. 6. The air vents 22 are formed on the adhesive surface over which the light-source substrate 20 and the adhesive layer 18 are bonded together. The air vents 22 are through-holes that extend through the light-source substrate 20. The air vents 22 are provided to efficiently remove air included in the adhesive layer. Preferably, the air vents 22 are provided in areas where the wiring pattern 25 is not formed (refer to FIG. 5, hereinafter referred to as "recommendable hole position areas P"). More preferably, as illustrated in FIG. 6, each of the air vents 22 is desirably disposed on a straight line located to bisect the distance between adjacent two of the multiple light sources 17 in the longitudinal direction of the reflection sheet. Specifically, each of the air vents 22 is desirably disposed on a straight line V that is perpendicular to the longitudinal direction L and that is located to bisect a distance H, which is a distance between end surfaces of the multiple light sources 17 opposing across the corresponding recommendable hole position area P in the longitudinal direction of the reflection sheet 19.

The present embodiment facilitates removal of bubbles that form in the adhesive layer 18 and bubbles intervening between the adhesive layer 18 and the light-source substrate 20 when the reflection sheet 19 is manually bonded to the light-source substrate 20. Thus, the reflection sheet 19 can be evenly bonded to the light-source substrate 20, thereby preventing reduction of adhesive strength. This structure can thus effectively prevent uneven luminance from occurring due to thermal contraction of the reflection sheet 19 under a predetermined high-temperature environment, and enables uniform illumination.

(Manufacturing Method)

Figure 7:
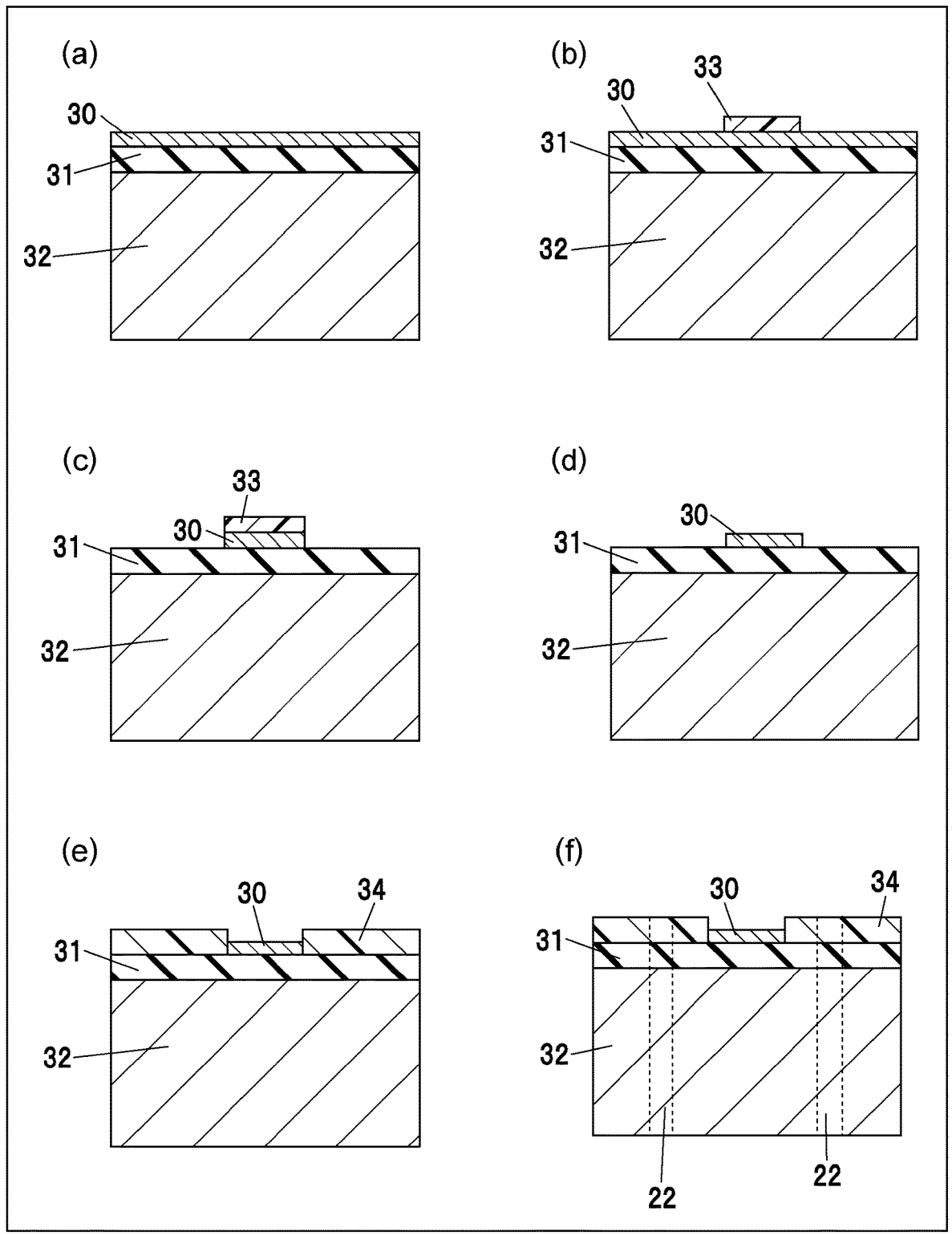
FIG. 7 illustrates a process for manufacturing a light-source substrate.

A process of manufacturing a light-source substrate including an air vent will now be described with reference to FIGS. 7(a) to 7(f). FIGS. 7(a) to 7(f) illustrate the process of manufacturing a light-source substrate, and are cross-sectional view of the light-source substrate in order of the manufacturing process. First, as shown in FIG. 7(a), a material such as a metal-base printed-circuit-board material is cut into a predetermined panel size. The metal-base printed-circuit-board material includes three layers, that is, an electric conductor 30, an insulator layer 31, and a metal substrate 32 in order from the top. An example used as the electric conductor 30 is copper foil. An example used as the metal substrate 32 is aluminum or copper. As illustrated in FIG. 7(b), an etching resist 33 is screen-printed on a portion of the electric conductor 30 to form a wiring pattern. Subsequently, as illustrated in FIG. 7(c), the electric conductor 30 is etched to remove the copper foil (electric conductor 30) from the area other than the area on which the etching resist 33 is formed. Subsequently, as illustrated in FIG. 7(d), the remaining etching resist 33 is removed to form a wiring pattern from the electric conductor 30 on the insulator layer 31 of the metal substrate 32. Subsequently, as illustrated in FIG. 7(e), to prevent solder from adhering to an unintended portion during processes of insulation between wiring patterns and soldering, a solder resist 34 is screen-printed on a portion of the insulator layer 31 on which the electric conductor 30 is not disposed, and then cured by ultraviolet (UV) irradiation. This is performed to prevent solder from flowing out to prevent different circuits from being short-circuited. Subsequently, as illustrated in FIG. 7(f), through-holes are formed to form the air vents 22. Thereafter, the substrate is subjected to surface treatment (gold plating), screen-printing (such as characters), and profile treatment.

With the above processes, the air vents 22 are formed in the light-source substrate 20.

The light-source substrate 20 thus including the air vents 22 can enhance the bonding strength between the reflection sheet 19 and the light-source substrate 20, and enhance the light use efficiency. This is because an air layer is less likely to form between the adhesive layer 18 disposed on the reflection sheet 19 and the solder resist 34 of the light-source substrate 20.

Second Embodiment

Figure 8:
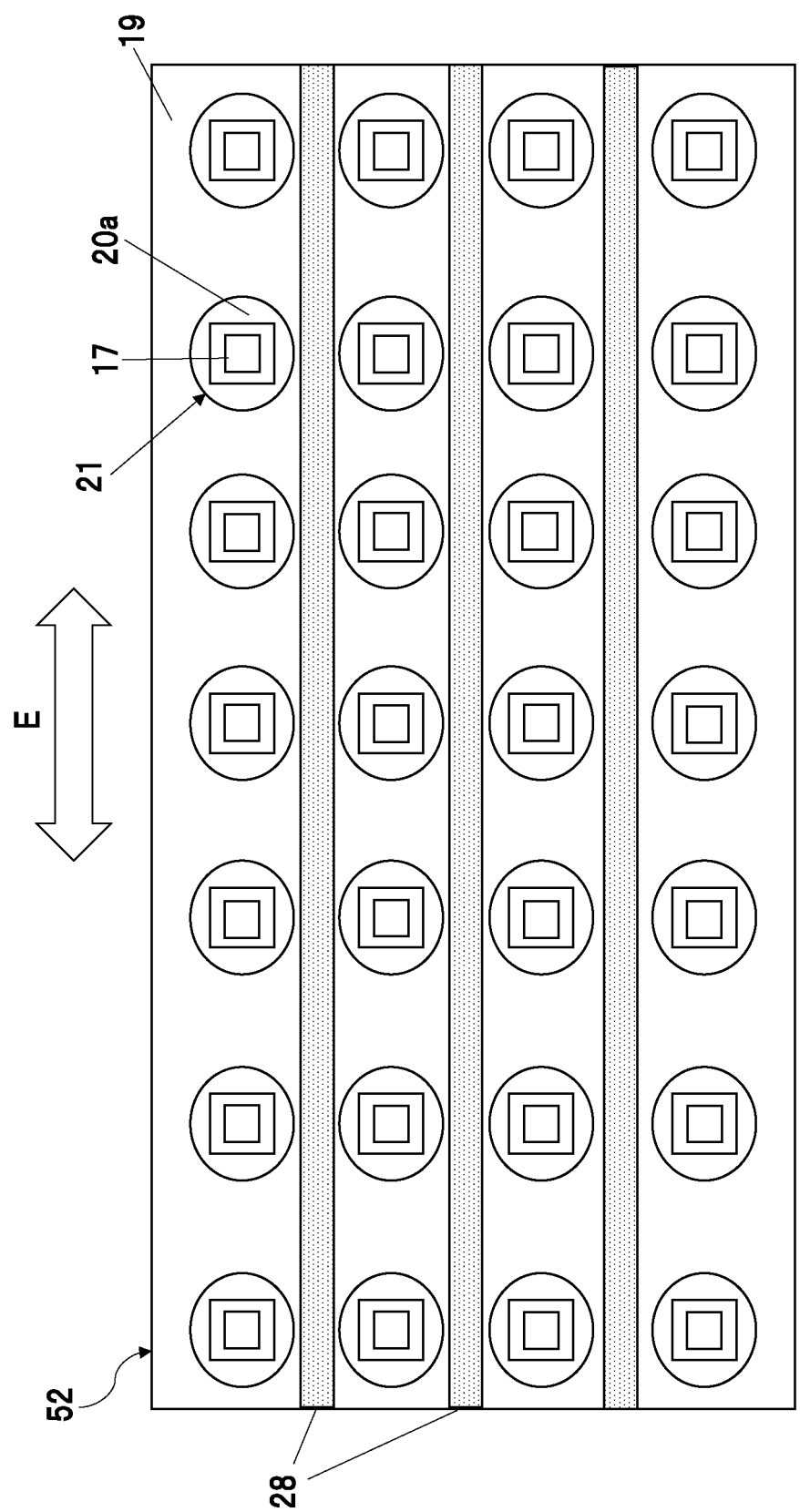
FIG. 8 is a schematic plan view of an illumination device according to a second embodiment.

FIG. 8 is a schematic diagram of another example, that is, an illumination device 52 according to a second embodiment for illustrating the positions to which adhesive layers are bonded, and where the light-source substrate 20 is viewed from the top. The illumination device 52 according to the second embodiment described below has a basic structure similar to that according to the first embodiment. Thus, the same components are denoted with the same reference signs according to the first embodiment, and not described in detail.

Adhesive layers 28 according to the present embodiment each are shaped in a stripe, and extend parallel to the longitudinal direction of the reflection sheet 19 at portions of the reflection sheet 19. Specifically, during manufacture of the reflection sheet 19, the adhesive layers 28 are disposed parallel to the direction in which the reflection sheet 19 extends. This structure reduces the effect of thermal contraction on the reflection sheet 19 under a predetermined high-temperature environment, and can effectively prevent an occurrence of uneven luminance. This is because the adhesive layers 28 extending in the direction of thermal contraction of the reflection sheet 19 have a large effect of preventing thermal contraction of the reflection sheet 19. The illumination device 52 with this structure enables uniform illumination, as in the case of the first embodiment.

Unlike in the case of the first embodiment, the adhesive layers 28 are disposed on only part of the reflection sheet 19 instead of its entire surface to sufficiently function and reduce the cost. Moreover, the adhesive layers 28 have a smaller area, and fewer air vents, which bring about an effect of reduction of the manufacturing process.

Third Embodiment

Figure 9:
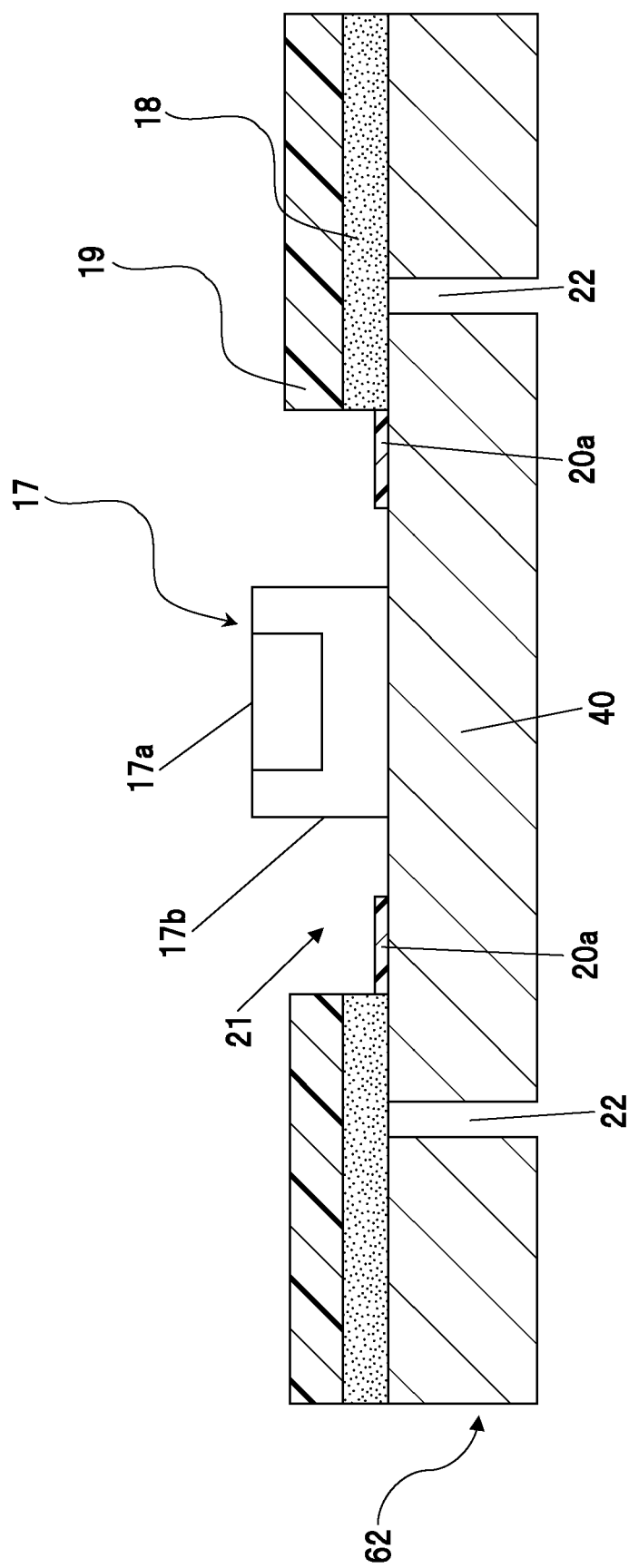
FIG. 9 is a schematic cross-sectional view of an illumination device according to a third embodiment.

FIG. 9 is a schematic diagram of another example, that is, an illumination device 62 according to a third embodiment in cross section. The illumination device 62 according to the third embodiment differs from the illumination device 12 according to the first embodiment in that a light-source substrate 40 has a larger thickness.

The light-source substrate 40 is formed from a thermally conductive metal material such as copper or aluminum as a base. Thus, the light-source substrate 40 having a larger thickness than the light-source substrate 20 according to the first embodiment can obtain a higher heat dissipation effect.

Figure 10:
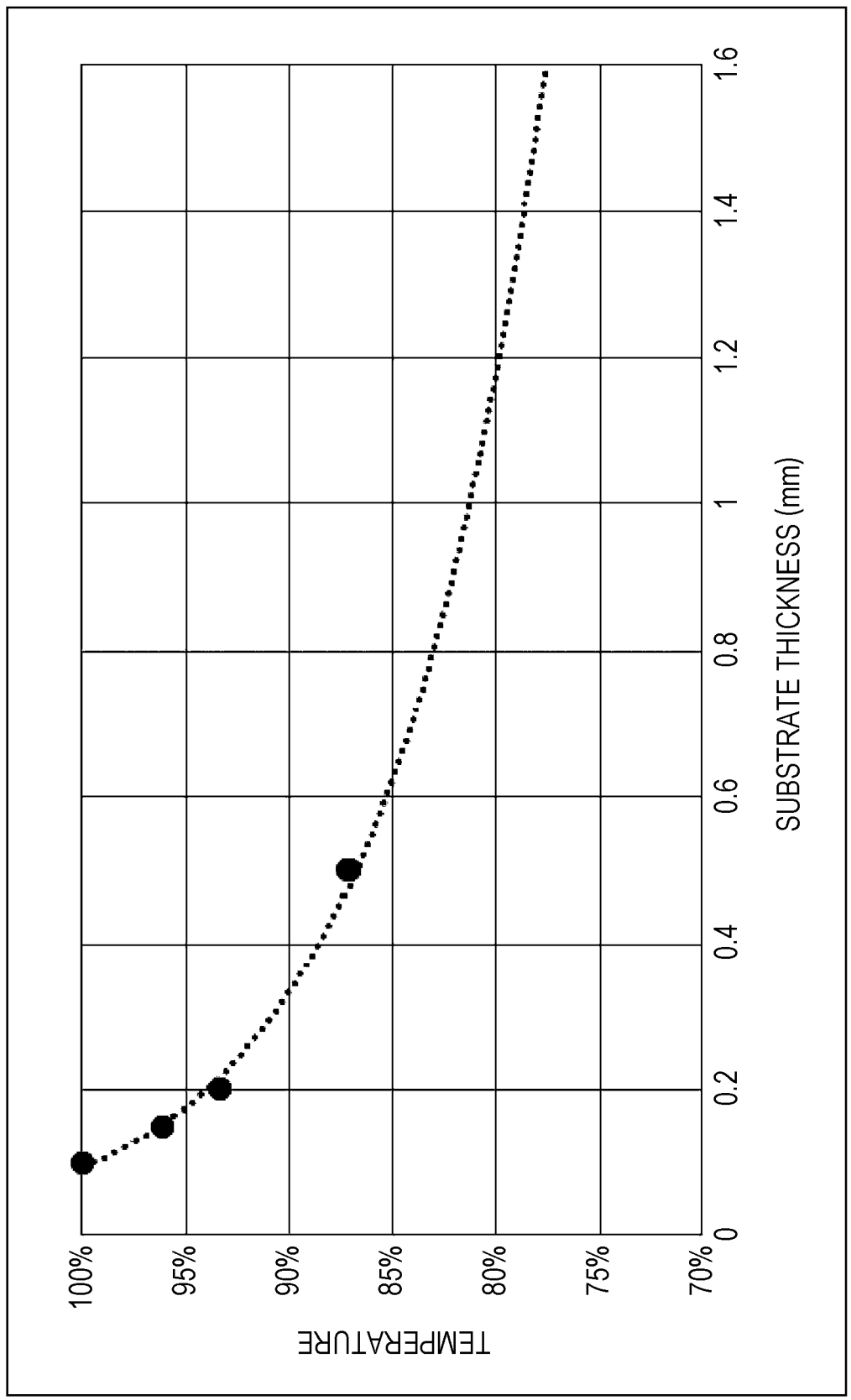
FIG. 10 illustrates results of a heat-dissipation simulation of the light-source substrate.

Actually, FIG. 10 shows the results of a heat-dissipation simulation under the conditions where the substrate is made of an aluminum alloy (emissivity of 0.1) and the configuration temperature is 300 K. In this simulation, the standard thickness of the substrate is determined to 0.1 mm, and the standard temperature is determined to 1.0. Properly speaking, the temperature shown with the vertical axis in FIG. 10 is ΔT (value obtained by subtracting the configuration temperature from the simulation temperature). FIG. 10 shows that increasing the thickness of the substrate further from 0.1 mm increases the effect of heat dissipation. The thickness of the substrate is thus preferably 2.0 mm or smaller.

The above structure can prevent the thermal effect on the reflection sheet 19, prevent thermal contraction of the reflection sheet 19, and prevent reduction of the bonding strength between the light-source substrate 40 and the reflection sheet 19. A back chassis (not illustrated) may be disposed on the surface of the light-source substrate 40 opposite to the surface on which the reflection sheet 19 is laminated. Here, the back chassis refers to a metal-made housing. This structure transfers heat produced by the light sources 17 to the light-source substrate 40 and the back chassis for enhancing the heat dissipation effect.

Fourth Embodiment

Figure 11:
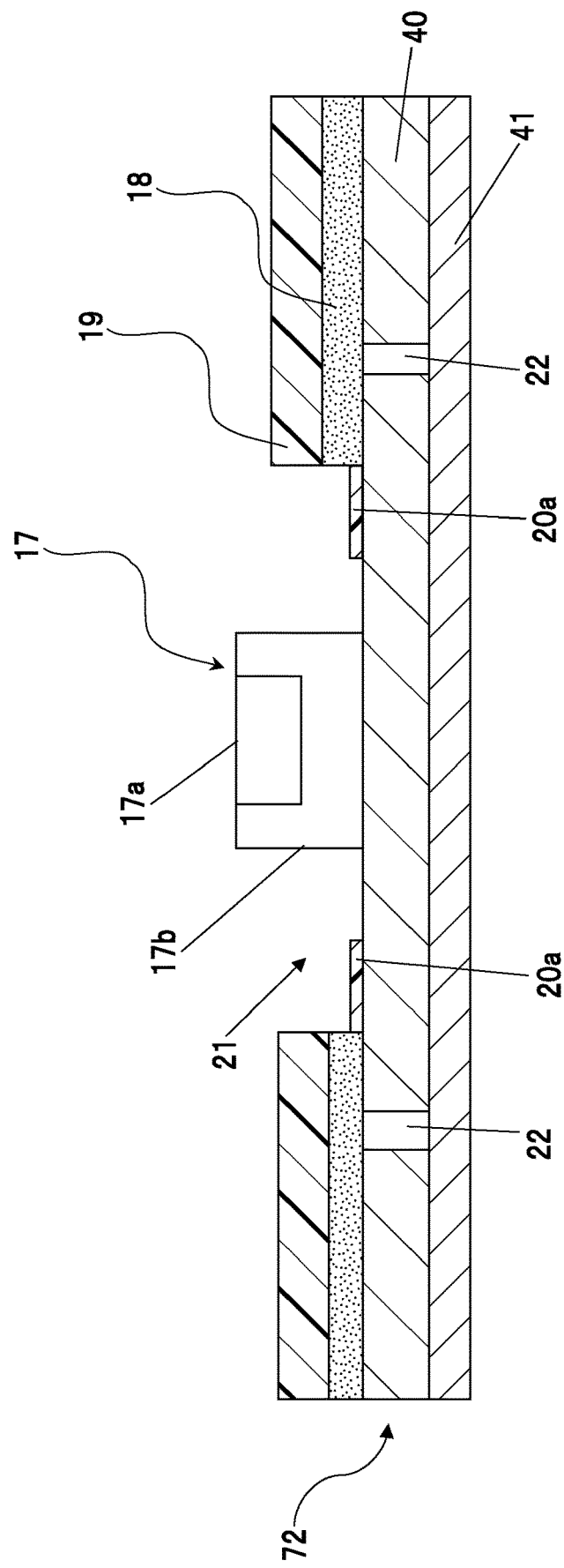
FIG. 11 is a schematic cross-sectional view of a portion of a light source according to a fourth embodiment.

FIG. 11 is a schematic diagram of another example, that is, an illumination device 72 according to a fourth embodiment including a dissipator sheet 41 on the surface of the light-source substrate 40 opposite to the surface on which the reflection sheet 19 is laminated.

The dissipator sheet 41 has a shape of a rectangle having substantially the same dimensions as those of the light-source substrate 40. The dissipator sheet 41 is made of, for example, a highly thermally conductive material such as graphite. The dissipator sheet 41 covers the entire surface of the light-source substrate 40 opposite to the surface on which the reflection sheet 19 is laminated. Similarly to the third embodiment, the dissipator sheet 41 may be structured to be in contact with a metal-made back chassis (not illustrated) disposed on the surface of the light-source substrate 40 opposite to the light emission direction. Specifically, the dissipator sheet 41 may be disposed on the surface of the back chassis described in the third embodiment apart from the light-source substrate 40.

The present embodiment may employ the structure according to the third embodiment. Specifically, the light-source substrate 40 may have a larger thickness. This structure can reduce heat produced at the light-source substrate 40, and prevent thermal contraction of the reflection sheet 19. This structure thus enables uniform illumination as in the case of the first embodiment.

Fifth Embodiment

Figure 12:
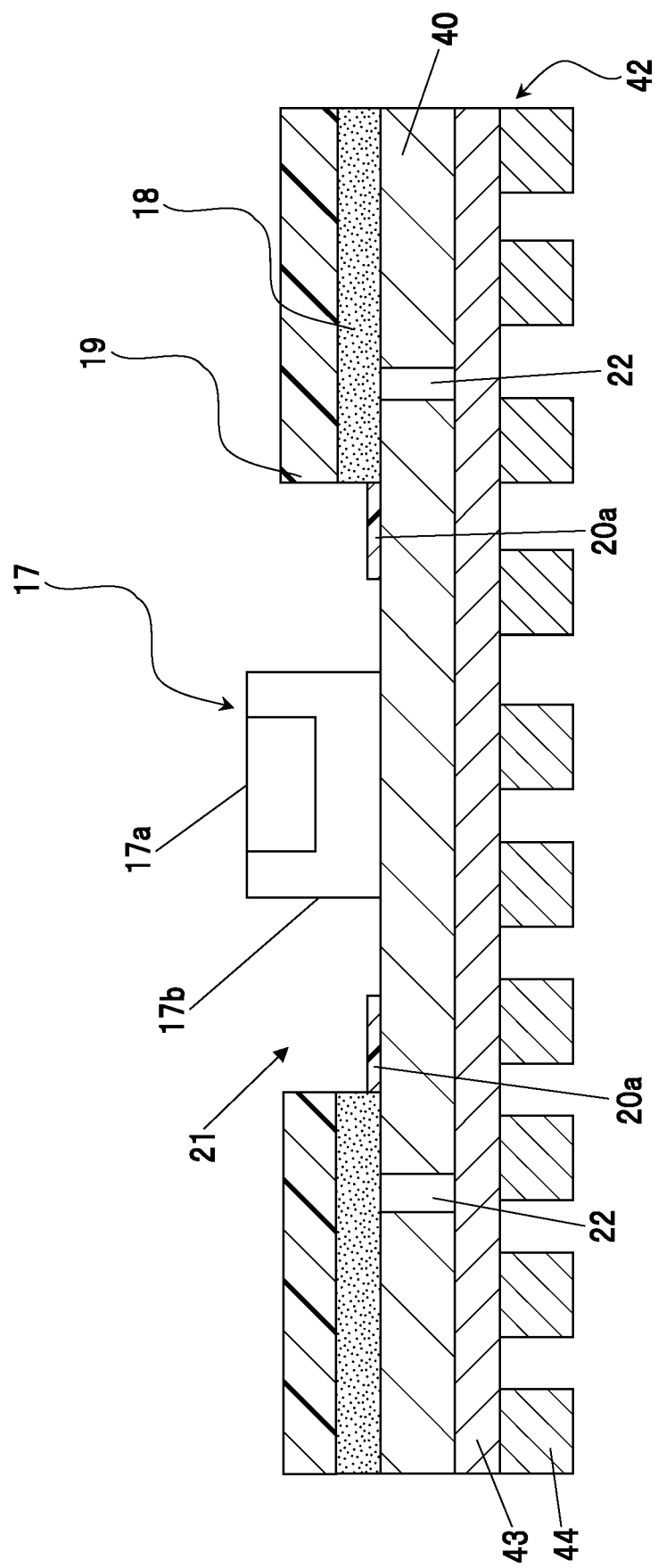
FIG. 12 is a schematic cross-sectional view of a portion of a light source according to a fifth embodiment.

FIG. 12 is a schematic diagram of another example, that is, an illumination device 82 according to a fifth embodiment including a heat sink 42 on the surface of the light-source substrate 40 opposite to the surface on which the reflection sheet 19 is laminated. The heat sink 42 is disposed in contact with the light-source substrate 40. The heat sink 42 includes a body 43, which is in contact with the entirety of the light-source substrate 40 to absorb heat from the light-source substrate 40, and multiple radiator fins 44, which increase the surface area to enhance the heat dissipation effect. The body 43 and the radiator fins 44 are made of an electrically conductive metal material such as copper or aluminum. As illustrated in FIG. 12, the radiator fins 44 are arranged equidistantly and project in a direction opposite to the direction in which the reflection sheet 19 is laminated on the light-source substrate 40. The radiator fins 44 are plate-shaped members extending vertically in the direction away from the light emission direction. The radiator fins 44 extend in the lateral direction of the light-source substrate 40 for facilitating convection. This structure increases the area over which the radiator fins 44 come into contact with air, enables reduction of heat produced at the light-source substrate 40, and can prevent thermal, contraction of the reflection sheet 19. This embodiment thus enables uniform illumination as in the case of the first embodiment.

Sixth Embodiment

Figure 13:
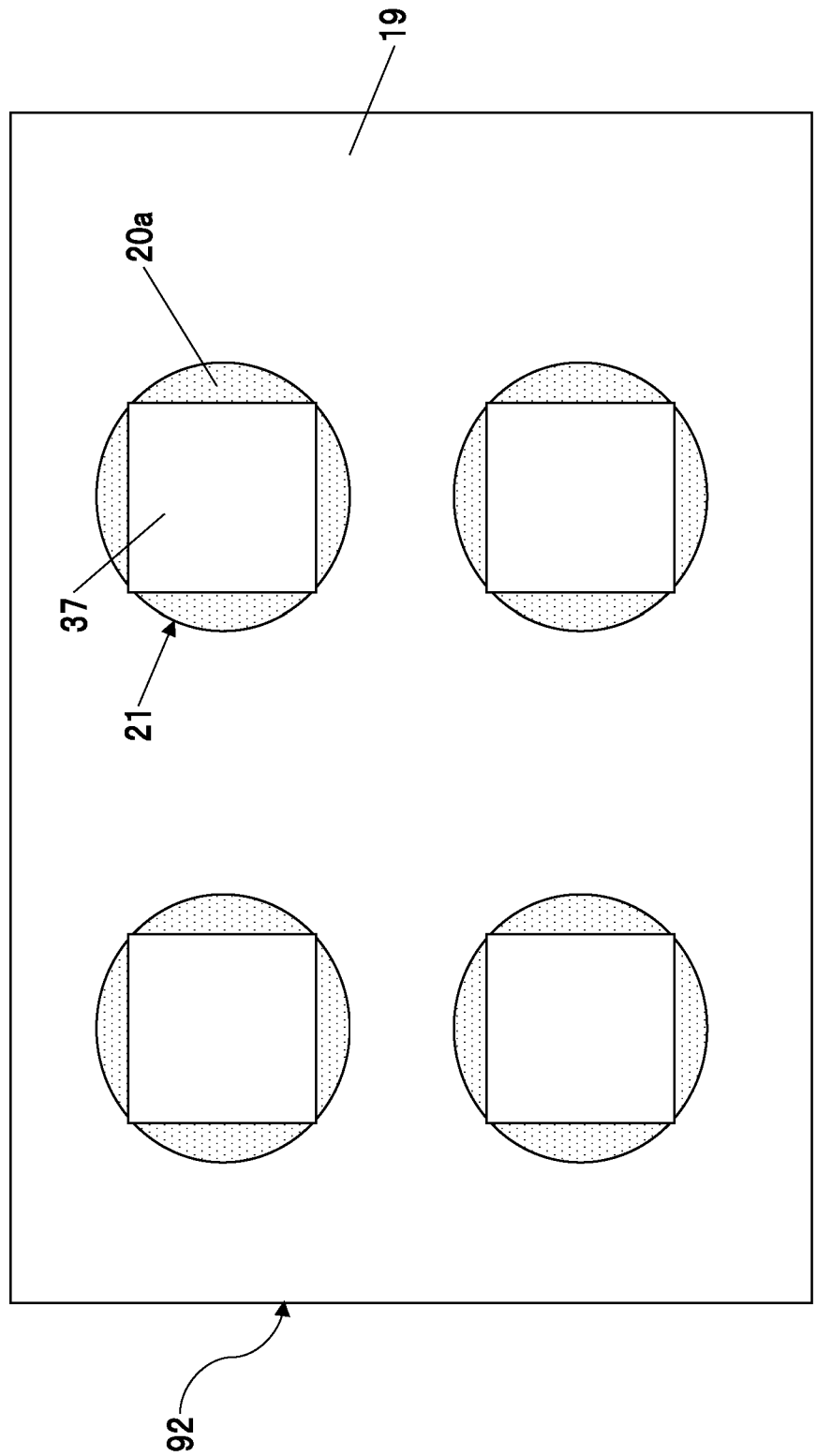
FIG. 13 is a schematic plan view of an illumination device according to a sixth embodiment.

FIG. 13 illustrates an illumination device 92 according to a sixth embodiment. The present embodiment differs from the above embodiments in the relationship between light sources 37 and the reflection sheet 19. Specifically, at least one of corners of each light source 37 is in contact with the reflection sheet 19, and other components are the same as those of the third to fifth embodiments. Corners are areas of the light source 37 that have an angle when viewed in a plan. In the present embodiment, each light source 37 is rectangular, and each light source opening 21 is circular, but they are not limited to these shapes.

As described in the first embodiment, the reflection sheet 19 has the light source openings 21. The openings in the reflection sheet 19 have their dimensions designed in consideration of the unevenness. Examples of unevenness include the unevenness in assembly of the reflection sheet and the unevenness of the opening positions. Thus, each opening is formed to allow the reflection sheet 19 and the light sources 37 to be spaced a certain gap therebetween. Each opening in the reflection sheet 19 is coated with a white ink to enhance the light reflection efficiency. The white ink has a reflectivity of approximately 70%, whereas the reflection sheet has a reflectivity of higher than or equal to 95%. The white ink has lower reflectivity than the reflection sheet, and thus, reduction of the area of the white resist 20a in the light source opening 21 enhances the light use efficiency.

Figure 14:
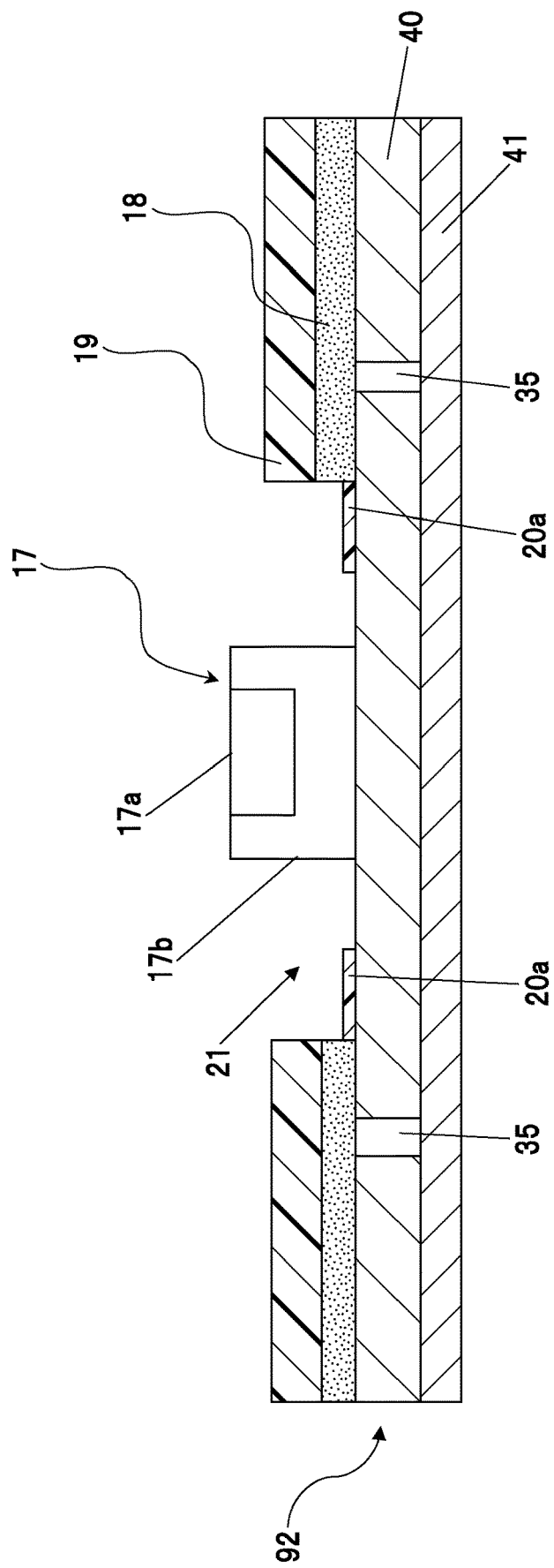
FIG. 14 is a schematic cross-sectional view of the illumination device according to the sixth embodiment illustrated in FIG. 13.

The third to fifth embodiments describe structures including a heat dissipation system on the surface of the light-source substrate 40 opposite to the surface on which the reflection sheet 19 is laminated. FIG. 14 is a schematic cross-sectional view of an illumination device 92 according to a sixth embodiment in FIG. 13. As illustrated in FIG. 14, each air vent 22 formed in the light-source substrate 40 is closed by the heat dissipation system to form a closed space 35. This space 35 has a heat insulation function and retains heat. The heat retained in the space 35 thermally affects at least the reflection sheet 19, so that the reflection sheet 19 thermally contracts. Thus, each light source opening 21 in the reflection sheet 19 reduces its area, and finally comes into contact with at least one of the corners of the light source 17. The area of the white ink is thus reduced, whereas the area of the reflection sheet increases, so that the light reflection efficiency can be enhanced. The above structure thus enables uniform illumination while enhancing the light use efficiency.

Other Embodiments

Figure 15:
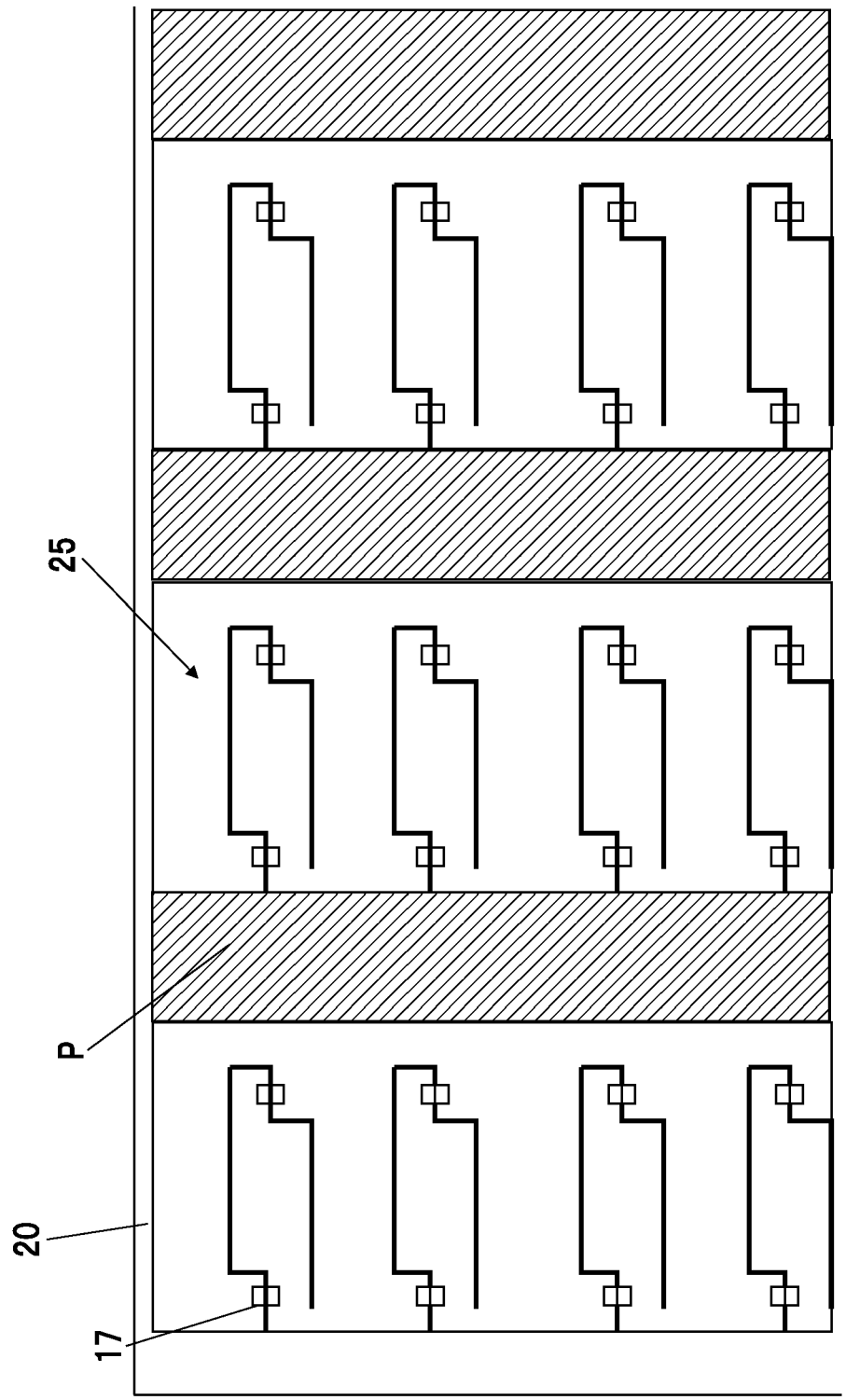
FIG. 15 illustrates another wiring pattern.
Figure 16:
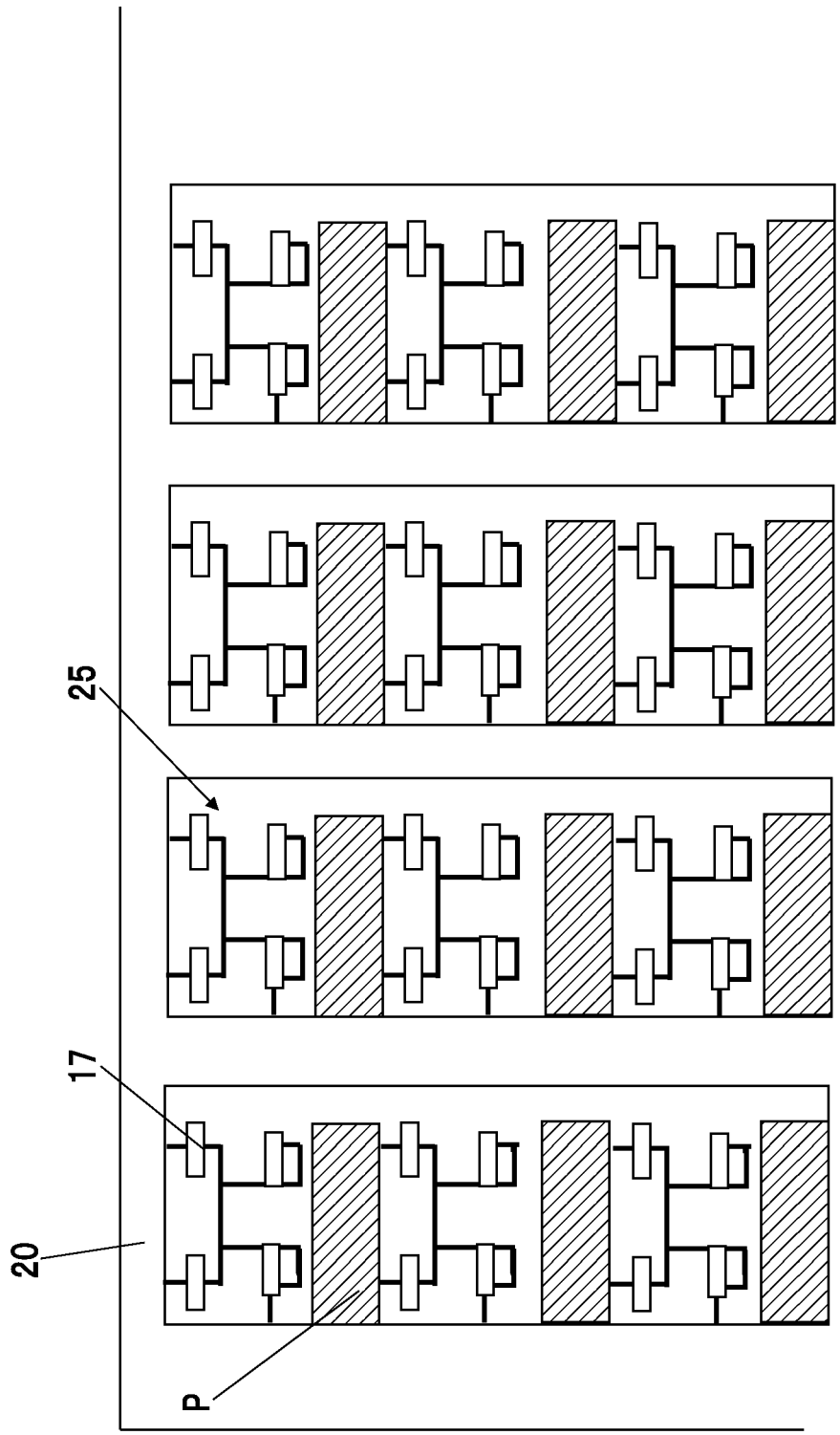
FIG. 16 illustrates another wiring pattern.
Figure 17:
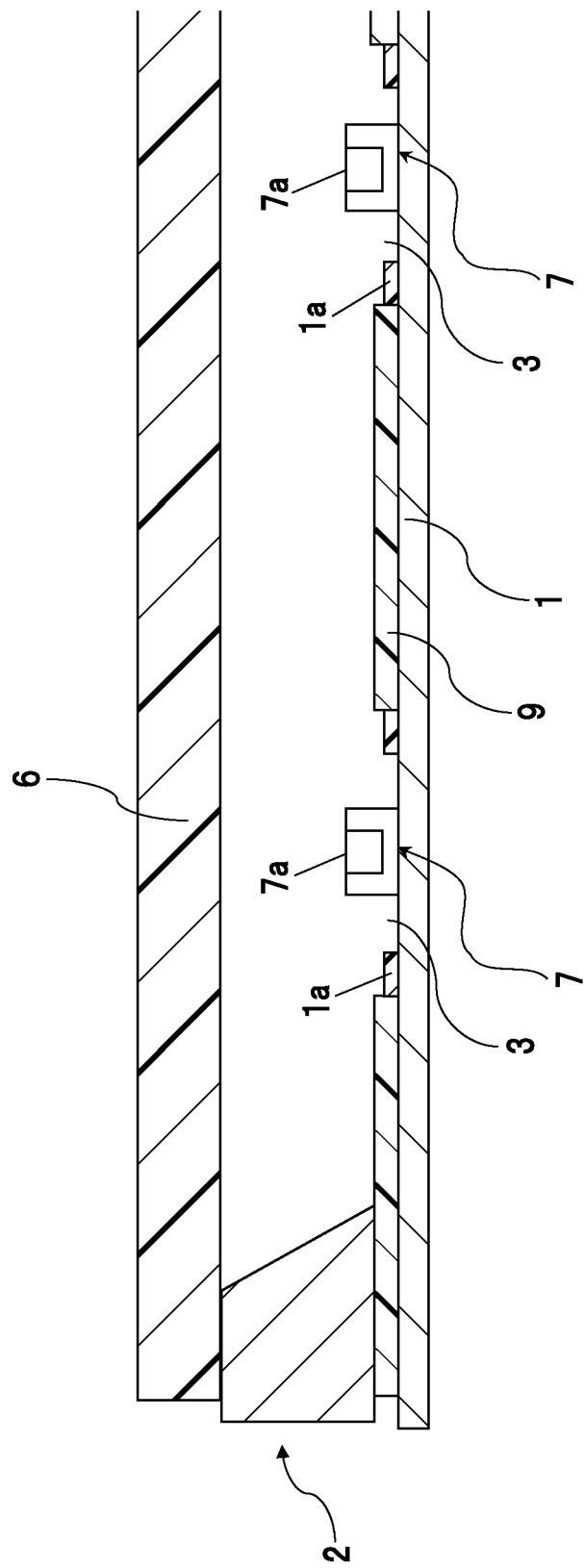
FIG. 17 is a schematic cross-sectional view of a portion of a liquid crystal display device including an existing direct illumination device.
Figure 18:
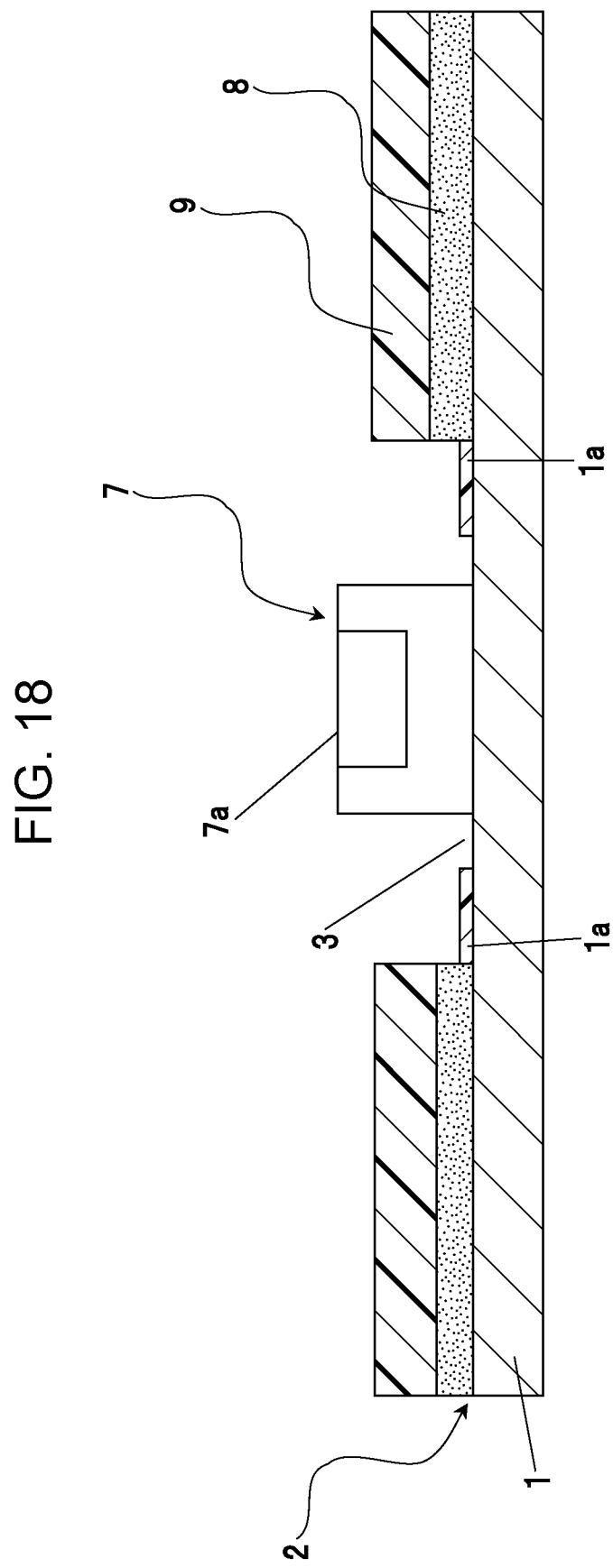
FIG. 18 is a schematic cross-sectional view of an existing direct illumination device.

The illumination device 12 according to the present invention and the liquid crystal display device 10 including the illumination device 12 can be embodied in various different manners other than the above embodiments. For example, as illustrated in FIGS. 15 and 16, the arrangement pattern of the light sources may be changed depending on driving of two or four light sources in series connection.

Each embodiment of the present invention has described the case where the liquid crystal display device (liquid crystal panel or illumination device) has a shape of horizontally oriented square when viewed in a plan. However, the liquid crystal display device may have a shape of a vertically oriented square, a regular square, an ellipse, a circle, or a trapezoid, in a plan view.

In the third to fifth embodiments, the radiating member may be applied to enhance the heat dissipation effect. Examples of the radiating member include anodized aluminum.

REFERENCE SIGNS LIST 10 liquid crystal display device
11 liquid crystal panel
2, 12, 52, 62, 72, 82, 92 illumination device
13 transparent protective member (TP/cover glass)
14 transparent binder
15 optical member group
6, 16 diffusion sheet
7, 17 light source
17a light-emitting surface
17b light-emitting side surface
8, 18, 28 adhesive layer
9, 19 reflection sheet
1, 20, 40 light-source substrate
1a, 20a white resist
3, 21 light source opening
4 bubble
22 air vent
23 anode wiring
24 cathode wiring (GND pattern)
25 wiring pattern
30 electric conductor
31 insulator layer
32 metal substrate
33 etching resist
34 solder resist
35 space
41 dissipator sheet
42 heat sink
43 body
44 radiator fin
E extension direction
L longitudinal direction
P recommendable hole position area
t thermal contraction amount

The invention claimed is:

1. An illumination device, comprising:
a substrate including a wiring pattern;
a plurality of light sources connected to the wiring pattern;
an adhesive layer disposed on the substrate; and
a reflection sheet bonded to the substrate with the adhesive layer interposed therebetween,
wherein the reflection sheet includes openings corresponding to the plurality of light sources,
wherein, in a first direction, the reflection sheet is located between the substrate and light-emitting surfaces of the light sources, and
wherein the substrate has an air vent in an area in which the wiring pattern is not disposed and the adhesive layer is disposed.

2. The illumination device according to claim 1, wherein the adhesive layer is disposed over an entirety of the reflection sheet.

3. The illumination device according to claim 1, wherein the adhesive layer extends in a stripe form in a longitudinal direction of the reflection sheet.

4. The illumination device according to claim 1, wherein the air vent is disposed on a straight line located to bisect a distance between adjacent two of the plurality of light sources in a longitudinal direction of the reflection sheet.

5. The illumination device according to claim 1, wherein a heat dissipation system is disposed on a surface of the substrate opposite to a surface on which the reflection sheet is laminated.

6. The illumination device according to claim 5, wherein the heat dissipation system includes a dissipator sheet.

7. The illumination device according to claim 5,
wherein the heat dissipation system includes a heat sink, and
wherein the heat sink includes a body and a radiator fin.

8. The illumination device according to claim 5, wherein at least one of corners of each of the light sources is in contact with a corresponding one of the openings in the reflection sheet.

9. A display device, comprising:
the illumination device according to claim 1; and
a display.

\* \* \* \* \*